United States Patent
Shang et al.

(10) Patent No.: US 9,424,788 B2
(45) Date of Patent: Aug. 23, 2016

(54) IMAGE DISPLAY DEVICE AND IMAGE DISPLAY METHOD

(71) Applicant: BOE TECHNOLOGY GROUP CO., LTD., Beijing (CN)

(72) Inventors: Guangliang Shang, Beijing (CN); Jing Lv, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 65 days.

(21) Appl. No.: 14/127,108

(22) PCT Filed: Nov. 30, 2012

(86) PCT No.: PCT/CN2012/085683
§ 371 (c)(1),
(2) Date: Dec. 17, 2013

(87) PCT Pub. No.: WO2013/102388
PCT Pub. Date: Jul. 11, 2013

(65) Prior Publication Data
US 2014/0118422 A1 May 1, 2014

(30) Foreign Application Priority Data
Jan. 5, 2012 (CN) .......................... 2012 1 0002223

(51) Int. Cl.
*G09G 3/36* (2006.01)
*G09G 5/10* (2006.01)
*H04N 13/04* (2006.01)

(52) U.S. Cl.
CPC ............... *G09G 3/3611* (2013.01); *G09G 5/10* (2013.01); *H04N 13/0454* (2013.01); *H04N 13/0497* (2013.01); *G09G 2310/0243* (2013.01); *G09G 2340/0435* (2013.01)

(58) Field of Classification Search
None
See application file for complete search history.

(56) References Cited

U.S. PATENT DOCUMENTS

2007/0242068 A1* 10/2007 Han .................. H04N 13/0409
345/427
2010/0289884 A1 11/2010 Kang
(Continued)

FOREIGN PATENT DOCUMENTS

CN 101888564 A 11/2010
CN 102081911 A 6/2011
(Continued)

OTHER PUBLICATIONS

International Preliminary Report on Patentability dated Jul. 8, 2014; PCT/CN2012/085683.
(Continued)

*Primary Examiner* — Jason Olson
*Assistant Examiner* — Krishna Neupane
(74) *Attorney, Agent, or Firm* — Ladas & Parry LLP

(57) ABSTRACT

Provided are an image display device and an image display method, which is capable of increasing charging period and reducing switching frequency of driving data while performing display device driving. The image display device comprises combined pixels of m columns and n rows, wherein each of the combined pixels comprises a first row of sub-pixels and a second row of sub-pixels beneath the first row of sub-pixels, wherein in a 2D image display mode, both the first rows of sub-pixels and the second rows of sub-pixels in the respective rows of combined pixels are driven and receive 2D display data; and in a 3D image display mode, one row of sub-pixels in the respective rows of combined pixels receives data and the other row of sub-pixels in the respective rows of combined pixels do not receive data.

18 Claims, 4 Drawing Sheets

(56) References Cited

U.S. PATENT DOCUMENTS

2011/0128269 A1* 6/2011 Lee .................. G02B 27/26
                                                    345/211
2011/0227886 A1   9/2011 Lee et al.
2012/0032949 A1* 2/2012 Lim .................. H04N 13/0434
                                                    345/419

FOREIGN PATENT DOCUMENTS

CN   102193260 A   9/2011
CN   102655599 A   9/2012

OTHER PUBLICATIONS

International Search Report mailed Mar. 7, 2013; PCT/CN2012/085683.

First Chinese Office Action dated Dec. 11, 2013; Appln. No. 201210002223.2.

Second Chinese Office Action Appln. No. 201210002223.2; Issued Jul. 30, 2014.

* cited by examiner

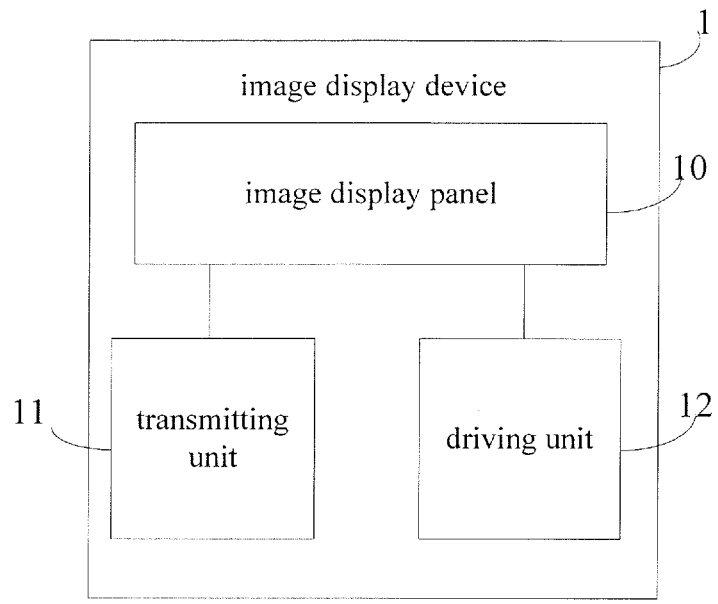

Fig.1

| | |
|---|---|
| in a 2D image display mode, both the first rows of sub-pixels and the second rows of sub-pixels in the respective rows of combined pixels are driven and receive 2D display data | S101 |
| in a 3D image display mode, one row of sub-pixels in the respective rows of combined pixels, which are driven, receives data and the other row of sub-pixels in the respective rows of combined pixels, which are not driven, do not receive data | S102 |

Fig.2

IMAGE DISPLAY DEVICE AND IMAGE DISPLAY METHOD

TECHNICAL FIELD OF THE DISCLOSURE

The present disclosure relates to the technical field of image display, and particularly to an image display device and an image display method.

BACKGROUND

Display devices provide a bridge in the communication between human and machines. Cathode Ray Tube (CRT) display devices dominate in past years, but a variety of image display devices are widely used due to the characteristics of a compact size, a low power consumption, and no radiation hazard in recent years since a variety of display technologies are proposed with the development of science. With the increase of requirements to 2D and 3D display, a 2D driving and a 3D driving in the image display device need improvement.

In the prior art, a patent with a patent number CN101888564A has proposed an image display device, wherein one pixel is divided into six sub-pixels, wherein three sub-pixels in a first row are controlled simultaneously by a first gate line through three thin-film transistors (TFTs), sub-pixels in a second row are controlled by a second gate line through three TFTs, data are transmitted from a first data line, a second data line and a third data lines to the three sub-pixels in the first row through the corresponding TFTs respectively, and the sub-pixels in the second row are also controlled by the three data lines through the corresponding TFTs respectively.

For the 2D driving, display data is input to the sub-pixels in the first row and luminance compensation data is input to the sub-pixels in the second row in a mixture manner by progressive alternating of horizontal lines. For the 3D driving, the display data is input to the sub-pixels in the first row and a black data is input to the sub-pixels in the second row in a mixture manner by progressive alternating of horizontal lines In the progressive scanning driving mode of the prior art, the sub-pixels in the first row are used for displaying a data image and the sub-pixels in the second row are used for luminance compensation or inputting the black data. However, when the progressive scanning is performed, the charging period for the sub-pixels in the first row displaying the data image occupies only half of a row scanning period, and another half of the row scanning period is used by the sub-pixels in the second row for luminance compensation or inputting the black data, rendering the charging period of normal display pixels is less; at the same time, one signal switching appears every half of the row scanning period, rendering frequency variations of gate line driving and data line driving increase and a modular power consumption increase.

SUMMARY

In embodiments of the present disclosure, there is provided an image display device and an image display method, wherein a row of pixels is divided into two rows of sub-pixels for operating separately, such that the switching frequency of the driving data is reduced while the charging period for the normal display sub-pixels is not reduced, thus the power consumption is reduced.

In order to achieve the above purpose, the following technical solutions are proposed in the embodiments of the present disclosure.

According to one aspect of the present disclosure, there is provided an image display device comprising:

an image display panel for displaying a 2D image or a 3D image by using a plurality of combined pixels;

wherein each of the plurality of combined pixels in the image display panel comprises a first row of sub-pixels and a second row of sub-pixels beneath the first row of sub-pixels, the first row of sub-pixels and the second row of sub-pixels form the combined pixel together, and for an individual row of the combined pixels, a first gate line is connected to the first row of sub-pixels and a second gate line is connected to the second row of sub-pixels;

a driving unit for driving the first rows of sub-pixels and the second rows of sub-pixels in the respective rows of combined pixels simultaneously when the image display panel is in a 2D image display mode, and for driving one row of sub-pixels in the respective rows of combined pixels and not driving the other row of sub-pixels in the respective rows of combined pixels when the image display panel is in a 3D image display mode;

a transmitting unit for simultaneously transmitting display data to the first rows of sub-pixels and the second rows of sub-pixels in the respective rows of combined pixels, which are driven by the driving unit, when the image display panel is in the 2D image display mode, and for transmitting the display data to one row of sub-pixels in the respective rows of combined pixels, which are driven by the driving unit, and not transmitting the data to the other row of sub-pixels in the respective rows of combined pixels, which are not driven by the driving unit, when the image display panel is in the 3D image display mode.

According to another aspect of the present disclosure, there is provided an image display method for driving a display device comprising combined pixels of m columns and n rows, wherein each of the combined pixels comprises a first row of sub-pixels and a second row of sub-pixels beneath the first row of sub-pixels, the first row of sub-pixels and the second row of sub-pixels form the combined pixel together, and for an individual row of combined pixels, a first gate line is connected to the first row of sub-pixels and a second gate line is connected to the second row of sub-pixels, the method comprising:

in a 2D image display mode, both the first row of sub-pixels and the second row of sub-pixels in the individual row of combined pixels receive 2D display data and are driven;

in a 3D image display mode, one row of sub-pixels in the individual row of combined pixels are driven and the other row of sub-pixels in the individual row of combined pixels are not driven, the one row of sub-pixels in the individual row of combined pixels, which are driven, receive the 3D display data and the other row of sub-pixels in the individual row of combined pixels, which are not driven, do not receive the 3D display data.

With the image display device and the image display method provided in the embodiments of the present disclosure, in the 2D image display mode, both the first rows of sub-pixels and the second rows of sub-pixels in the respective rows of combined pixels receive display data; in the 3D image display mode, the first rows of sub-pixels in the respective rows of combined pixels receive the display data and the second rows of sub-pixels in the respective rows of combined pixels do not receive data; when the 2D image display mode is converted into the 3D image display mode and the scanning for a display frame is completed, or it is in the blanking period, the second rows of sub-pixels in the respective rows of combined pixels receive a black picture data and the first rows of sub-pixels in the respective rows of combined pixels do not receive data. As compared with the prior art, both the first row of sub-pixels and the second row of sub-pixels in the individual row of combined pixels can receive the same display data simultaneously in the 2D image display mode, such that the period for receiving the display data can maintain a whole row scanning period and thus the charging period of the display pixels can be ensured; the first rows of sub-pixels and the second rows of sub-pixels are not progressively scanned in a same frame in the 3D image display mode, that is, only the first rows of sub-pixels or the second rows of sub-pixels are scanned in the same frame, such that the frequency variations of the gate line driving and the data line driving can be reduced and thus the power consumption can also be reduced.

BRIEF DESCRIPTION OF THE DRAWINGS

In order to more clearly describe the technical solutions of the embodiments of the present disclosure or the prior art, drawings necessary for describing the embodiments of the present disclosure or the prior art are simply introduced as follows. It should be obvious for those skilled in the art that the drawings described as follows are only some embodiments of the present disclosure and other drawings can be obtained according to these drawings without paying inventive efforts FIG. 1 is a schematic structure diagram of an image display device provided in a first embodiment of the present disclosure;

FIG. 2 is a flowchart of an image display method provided in a second embodiment of the present disclosure;

DETAILED DESCRIPTION

Figure 3:
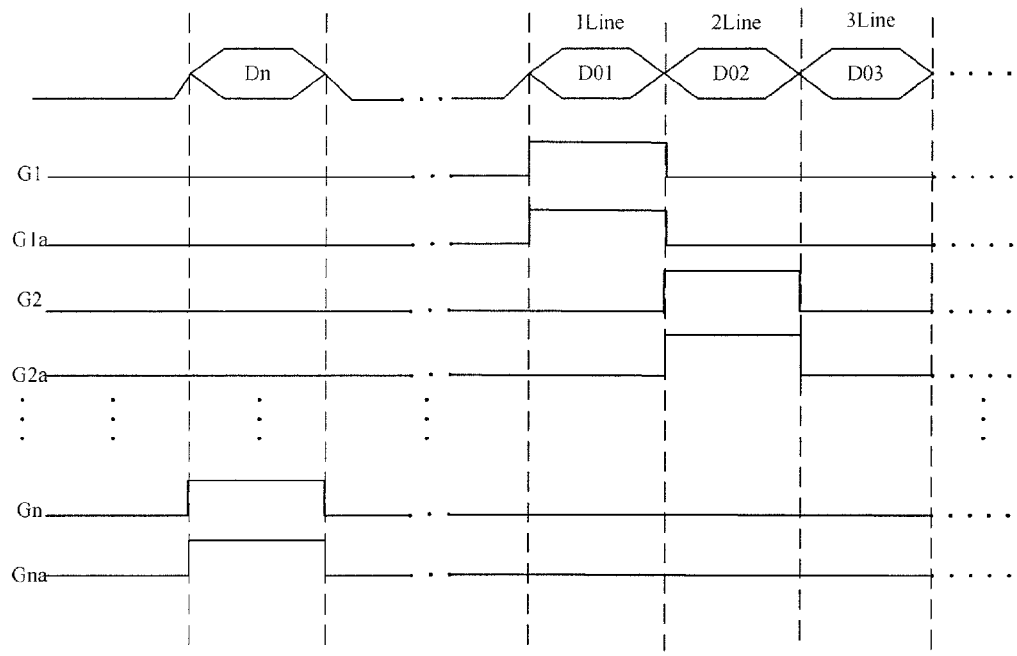
FIG. 3 is a timing sequence diagram of a 2D driving method of the image display device provided in the second embodiment of the present disclosure.

The technical solutions in embodiments of the present disclosure will be described clearly and completely below in connection with the accompanying drawings of the embodiments of the present disclosure. Obviously, the described embodiments are not all of embodiments of the present disclosure but only a part of embodiments of the present disclosure. With the teachings of the embodiments of the present disclosure, all of other embodiments obtained by those skilled in the art without paying creative labor should belong to the scope sought for protection in the present disclosure.

First Embodiment

An image display device provided in the first embodiment of the present disclosure is shown in FIG. 1, and comprises an image display panel 10, a transmitting unit 11 and a driving unit 12.

The image display panel 10 is used for displaying a 2D image or a 3D image by using a plurality of combined pixels.

Each of the plurality of combined pixels in the image display panel 10 comprises a first row of sub-pixels and a second row of sub-pixels beneath the first row of sub-pixels, the first row of sub-pixels and the second row of sub-pixels form the combined pixel together, and for an individual row of combined pixels, a first gate line is connected to the first row of sub-pixels and a second gate line is connected to the second row of sub-pixels.

It should be noted that the plurality of combined pixels form the image display panel 10 in a matrix of m rows and n columns, and an individual row of the combined pixels comprises a first row of sub-pixels and a second row of sub-pixels. In the present embodiment, the case where the transmitting unit transmits a 2D display data and a 3D display data is described merely as an example, but makes no limitation to the scope of the present disclosure.

The transmitting unit 11 is used for simultaneously transmitting a display data to the first rows of sub-pixels and the second rows of sub-pixels in the respective rows of combined pixels, which are driven by the driving unit 12, when the image display panel 10 is in a 2D image display mode, and for transmitting the display data to one row of sub-pixels in the respective rows of combined pixels, which are driven by the driving unit 12, and not transmitting the data to the other row of sub-pixels in the respective rows of combined pixels, which are not driven by the driving unit 12, during a update period of a same frame of image when the image display panel 10 is in a 3D image display mode.

The driving unit 12 is used for driving the respective rows of sub-pixels according to the 2D image display mode for displaying a 2D image or the 3D image display mode for displaying a 3D image; is used for driving the first rows of sub-pixels and the second rows of sub-pixels in the respective rows of combined pixels simultaneously when the image display panel 10 is in the 2D image display mode, such that the driving can maintain for a row scanning period; and is used for driving one row of sub-pixels in the respective rows of combined pixels, such that the driving can maintain for a row scanning period every time, and not driving the other row of sub-pixels in the respective rows of combined pixels during the update period of the same frame of image, when the image display panel 10 is in the 3D image display mode.

Furthermore, when the image display panel 10 is in the 2D image display mode, the driving unit 12 drives sequentially the first gate lines connected to the first rows of sub-pixels in the respective rows of combined pixels respectively to output gate driving pulses, each of which maintains for one row scanning period, the individual first row of sub-pixels are supplied a gate driving voltage, for example, by supplying the gate driving voltage to TFTs or liquid crystal capacitors of the first row of sub-pixels. The gate driving pulses output from the first gate lines under the driving of the driving unit 12 are transmitted at the same time to the respective second rows of sub-pixels through the second gate lines respectively, so as to supply the gate driving voltages to the respective second rows of sub-pixels.

It should be noted that the case where the 2D display data transmitted from the transmitting unit 11 is received in the 2D image display mode and the 3D display data transmitted from the transmitting unit 11 is received in the 3D image display mode is described merely as an example, and makes no limitation to the scope of the present disclosure.

When the image display panel 10 is in the 3D image display mode, the first rows of sub-pixels in the respective rows of combined pixels, which are driven by the driving unit 12, receive the 3D display data transmitted from the transmitting unit 11, and the transmitting unit 11 does not transmit a black picture data to the second rows of sub-pixels in the respective rows of combined pixels, which are not driven by the driving unit 12.

Alternatively, when the image display panel 10 is in the 3D image display mode, the second rows of sub-pixels in the respective rows of combined pixels, which are driven by the driving unit 12, receive the black picture data transmitted from the transmitting unit 11, and the transmitting unit 11 does not transmit the 3D display data to the first rows of sub-pixels in the respective rows of combined pixels, which are not driven by the driving unit 12.

Specifically, the 3D image display mode of the image display panel 10 can be classified into a case of receiving the display data and a case of inserting a black frame.

In the case of receiving the display data, the following operations are mainly performed.

The driving unit 12 drives sequentially the first gate lines connected to the first rows of sub-pixels in the respective rows of combined pixels respectively to output gate driving pulses, each of which maintains for one row scanning period, the individual first row of sub-pixels are supplied a gate driving voltage. In addition, the driving unit 12 does not drive the second gate lines connected to the second rows of sub-pixels in the respective rows of combined pixels respectively and the second gate lines do not output gate driving pulses.

At this time, the transmitting unit 11 transmits the 3D display data to the first row of sub-pixel, which are driven by the driving unit 12, and does not transmit the black picture data to the second row of sub-pixel, which are not driven by the driving unit 12.

In the case of inserting a black frame, the following operations are mainly performed.

The driving unit 12 drives sequentially the second gate lines connected to the second rows of sub-pixels in the respective rows of combined pixels respectively to output gate driving pulses, each of which maintains for one row scanning period, the individual second row of sub-pixels are supplied a gate driving voltage. In addition, the driving unit 12 does not drive the first gate lines connected to the first rows of sub-pixels in the respective rows of combined pixels respectively and the first gate lines do not output gate driving pulses.

At this time, the transmitting unit 11 transmits the black picture data to the second row of sub-pixel, which are driven by the driving unit 12, and does not transmit the 3D display data to the first row of sub-pixels, which are not driven by the driving unit 12.

It should be noted that the operations for inserting a black frame described herein may not only be performed after a completion of display scanning of a 3D display frame or a completion of display scanning of N 3D display frames, but also be performed during the blanking period, in order to ensure the quality of the displayed image; and may further be performed when the 2D image display mode is converted into the 3D image display mode, since the second rows of sub-pixels all receive the 2D display data in the 2D image display mode, the black picture data is required to be input to the second rows of sub-pixels when the 2D image display mode is converted into the 3D image display mode, such that a view angle of the displayed image may be ensured, and thus the quality of the displayed image may be ensured.

Of course, the operations for inserting the black frame are important measures for ensuring the quality of the displayed image in a Normal-White type display device. On the contrary, for a Normal-Black type display device, such operations for inserting the black frame may be omitted, since a black picture will be displayed in the case that no voltage is supplied on pixels of the Normal-Black type display device.

With the image display device provided in the embodiment of the present disclosure, in the 2D image display mode, both the first rows of sub-pixels and the second rows of sub-pixels in the respective rows of combined pixels receive display data; in the 3D image display mode, the first rows of sub-pixels in the respective rows of combined pixels receive the display data and the second rows of sub-pixels in the respective rows of combined pixels do not receive data; when the 2D image display mode is converted into the 3D image display mode, and when scanning for a display frame is completed, or when it is in the blanking period, the second rows of sub-pixels in the respective rows of combined pixels receive the black picture data and the first rows of sub-pixels in the respective rows of combined pixels do not receive data. As compared with the prior art, both the first row of sub-pixels and the second row of sub-pixels in the individual row of combined pixels may receive the same display data simultaneously in the 2D image display mode, such that the period for receiving the display data can reach a whole row scanning period and thus the charging period of the display pixels can be ensured; the first row of sub-pixels and the second row of sub-pixels are not progressively scanned in a same frame in the 3D image display mode, that is, only the first row of sub-pixels or the second row of sub-pixels are scanned in a same frame, such that the frequency variations of the gate line driving and the data line driving can be reduced and thus the power consumption can also be reduced.

Second Embodiment

An image display method provided in the second embodiment of the present disclosure is used for driving an image display device comprising combined pixels of m columns and n rows, wherein each of the combined pixels comprises a first row of sub-pixels and a second row of sub-pixels beneath the first row of sub-pixels, the first row of sub-pixels and the second row of sub-pixels form the combined pixel together, and for an individual row of the combined pixels, a first gate line is connected to the first row of sub-pixels and a second gate line is connected to the second row of sub-pixels. The image display method will be described in detail in combination with the flowchart shown in FIG. 2.

It should be noted that there is no order relationship between step S101 and t S102 in FIG. 2, and actually the step S101 may be performed before or after the step S102, or the step S101 and the step S102 may be performed at the same time. When it is the case where the 2D image display mode is converted into the 3D image display mode, the step S101 may be performed before the step S102.

It should be noted that a case where a 2D display data is received in the 2D image display mode and a 3D display data is received in the 3D image display mode is described merely as an example, and makes no limitation to the scope of the present disclosure.

At step S101, in the 2D image display mode, both the first rows of sub-pixels and the second rows of sub-pixels in the respective rows of combined pixels are driven and receive 2D display data.

It should be noted that data received every time maintains for one row scanning period.

For example, as shown in FIG. 3, it is assumed that: G1 is the first gate line connected to the first row of sub-pixels in the first row of combined pixels, G1a is the second gate line connected to the second row of sub-pixels in the first row of combined pixels; in a similar way, Gn is the first gate line connected to the first row of sub-pixels in the $n^{th}$ row of combined pixels, Gna is the second gate line connected to the second row of sub-pixels in the $n^{th}$ row of combined pixels.

G1, G2, . . . , and Gn output gate driving pulses sequentially, each gate driving pulse maintains for one row scanning period and supplies a gate driving voltage to the first row of sub-pixels in a corresponding row of combined pixels. The gate driving pulse output from G1 is transmitted to a corresponding second row of sub-pixels via the corresponding second row of sub-pixels at the same time so as to supply the gate driving voltage. The operation principles of G2a to Gna are same as that of G1, and repeated descriptions are omitted.

At the same time, the first rows of sub-pixels and the second rows of sub-pixels in the respective rows of combined pixels, which are driven, receive the 2D display data simultaneously to display an image.

At step 102, in the 3D image display mode, one row of sub-pixels in the respective rows of combined pixels are driven and receive data, and the other row of sub-pixels in the respective rows of combined pixels are not driven and do not receive data.

It should be noted that the period during which data is received every time is one row scanning period, and that the one row of sub-pixels in the respective rows of combined pixels, which are driven, receive data, and the other row of sub-pixels in the respective rows of combined pixels, which are not driven, do not receive data during the update period of a same frame of image.

Figure 4:
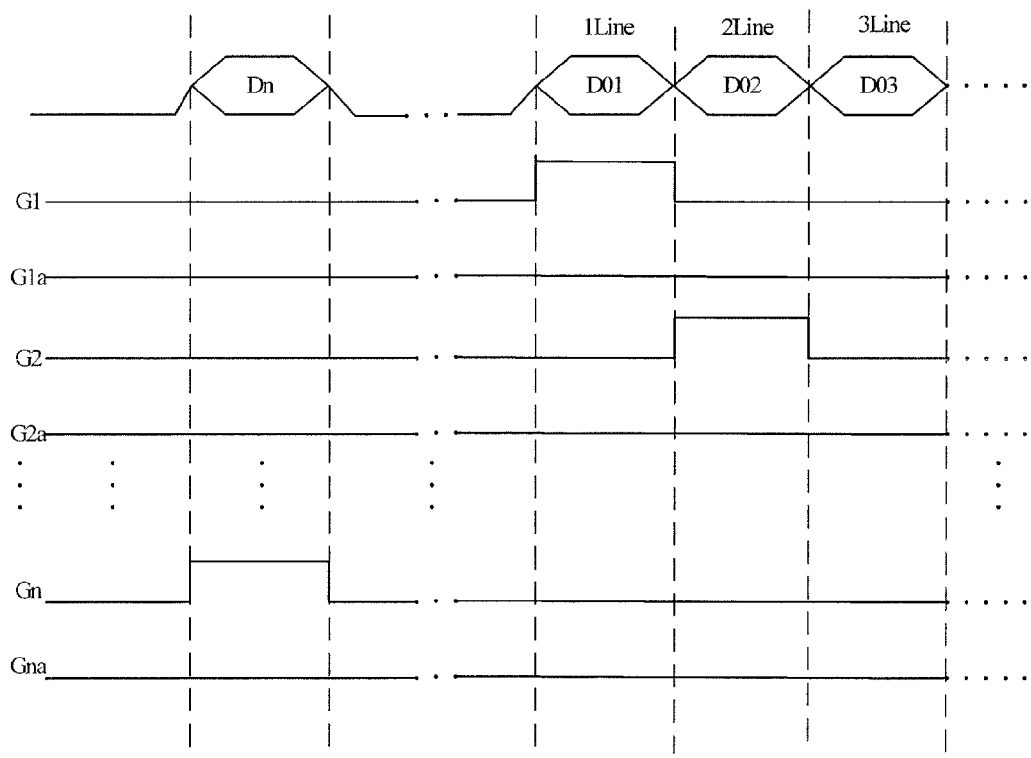
FIG. 4 is a timing sequence diagram of a 3D driving method of the image display device provided in the second embodiment of the present disclosure.

For example, the first rows of sub-pixels in the respective rows of combined pixels, which are driven, receive 3D display data, wherein the period during which data is received every time maintains one row scanning period, and the second rows of sub-pixels in the respective rows of combined pixels, which are not driven, do not receive data. As shown in FIG. 4, it is assumed that: G1 is the first gate line connected to the first row of sub-pixels in the first row of combined pixels, G1a is the second gate line connected to the second row of sub-pixels in the first row of combined pixels; in a similar way, Gn is the first gate line connected to the first row of sub-pixels in the $n^{th}$ row of combined pixels, Gna is the second gate line connected to the second row of sub-pixels in the $n^{th}$ row of combined pixels.

The first rows of sub-pixels in the respective rows of combined pixels are charged respectively, that is, G1, G2, . . . , Gn are input the gate driving pulses sequentially, each gate driving pulse maintains for one row scanning period, the respective first rows of sub-pixels receive the corresponding input gate driving pulse and are turned on. The second rows of sub-pixels in the respective rows of combined pixels maintain to be turned off until the scanning of the current 3D display frame is completed. The first rows of sub-pixels in the respective rows of combined pixels, which are driven, receive the 3D display data, respectively, and the second rows of sub-pixels in the respective rows of combined pixels, which are not driven, do not receive the black picture data.

Figure 5:
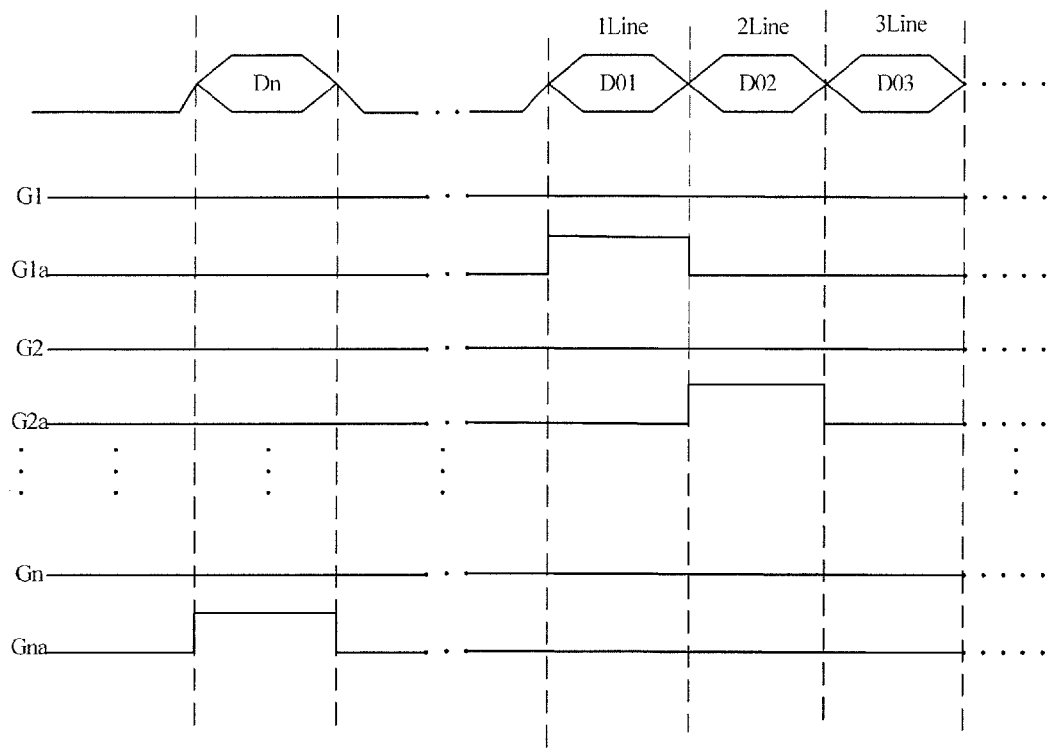
FIG. 5 is a timing sequence diagram of a black level inserting method in the 3D driving method of the image display device provided in the second embodiment of the present disclosure.

Alternatively, the second rows of sub-pixels in the respective rows of combined pixels, which are driven, receive the black picture data, and the data received every time maintains for one row scanning period, and the first rows of sub-pixels in the respective rows of combined pixels, which are not driven, do not receive data. As shown in FIG. 5, it is still assumed that: G1 is the first gate line connected to the first row of sub-pixels in the first row of combined pixels, G1a is the second gate line connected to the second row of sub-pixels in the first row of combined pixels; in a similar way, Gn is the first gate line connected to the first row of sub-pixels in the $n^{th}$ row of combined pixels, Gna is the second gate line connected to the second row of sub-pixels in the $n^{th}$ row of combined pixels.

G1a, G2a, . . . , Gna connected to the second rows of sub-pixels in the respective rows of combined pixels respectively output gate driving pulses sequentially, each gate driving pulse maintains for one row scanning period; G1, G2, . . . , Gn connected to the first rows of sub-pixels in the respective rows of combined pixels respectively do not output gate driving pulses. Particularly, the second rows of sub-pixels in the respective rows of combined pixels, which are driven, receive the black picture data, and the first rows of sub-pixels in the respective rows of combined pixels, which are not driven, do not receive the 3D display data.

Specifically, the operations for inserting the black frame as shown in FIG. 5 may not only be performed after the completion of display scanning of a 3D display frame, but also be performed when the 2D image display mode is converted into the 3D image display mode. That is, in a state that the respective first rows of sub-pixels are turned off, G1a, G2a, . . . , Gna charge the respective second rows of sub-pixels sequentially and the respective second rows of sub-pixels receive the black picture data output from the data lines until the scanning of the inserted black frame of the respective second rows of sub-pixels is completed in the 3D image display mode.

Figure 6:
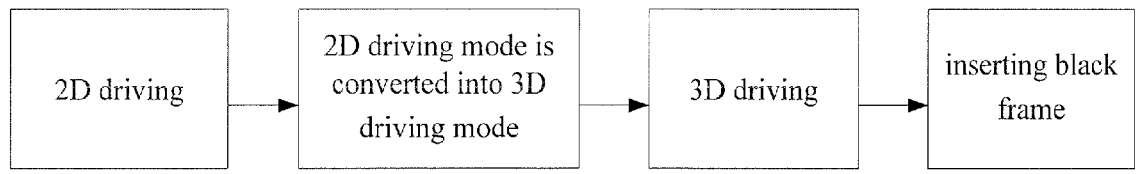
FIG. 6 is a schematic diagram of a driving method of the image display device provided in the second embodiment of the present disclosure.

It should be noted that, in detailed implementations, the above operations for inserting the black frame can be applied to the Normal-White type display device and the Normal-Black type display device, since a current leakage phenomenon may exist in the driving of the Normal-White type display device, which may cause a reduction of the quality of the displayed image, the scanning for the inserted black frame may ensure the black picture data be maintained in the respective second rows of sub-pixels. Therefore, as shown in FIG. 6, the operations for inserting the black frame are important measures for a Normal-White type liquid crystal display device to perform image display, that is, when the 2D image display mode is switched to the 3D image display mode in the Normal-White type display device, the operations for inserting the black frame is required to be performed at first and the 3D display data is then received. Particularly, in order to ensure the quality of the displayed image, the operations for inserting the black frame may be performed once after the completion of every current 3D display frame or the completion of every several 3D display frames. However, for the Normal-Black type display device, its liquid crystal state may ensure that the respective rows maintain a black picture before the display data is supplied after the display device is powered on, therefore G1a, G2a, . . . , and Gna connected to the respective second rows of sub-pixels in the respective rows of combined pixels respectively may maintain a low level and the respective second rows of sub-pixels in the respective rows of combined pixels may maintain a black picture even no black picture data is received. It should be noted that, in order to make sure of a better effect of the black picture, the black picture may be inserted in the Normal-Black type display device in a same manner as the Normal-White type display device so as to maintain the black picture, although the Normal-Black type display device can maintain the black picture by using the liquid crystal state without inserting the black frame.

In the above display driving method of the liquid crystal display device, the first rows of sub-pixels in the respective rows of combined pixels are gate-driven sequentially and the gate driving for the individual first row of sub-pixels maintains for a row scanning period. As compared with the prior art, the charging period may be ensured, which benefits for the display of the 3D image. On the other hand, the second rows of sub-pixels in the respective rows of combined pixels receive the black picture data after the completion of the scanning of the current 3D display frame, such that the second rows of sub-pixels and the first rows of sub-pixels are not scanned progressively in a same frame, the scanning frequency (comprising the frequencies of the gate line driving and the data line driving) in one frame may be decreased, and thus the power consumption is also reduced. In addition, for the Normal-White type display device, the black picture data is input to the respective second rows of sub-pixels, such that an effect of the current leakage phenomenon on the quality of the black picture may be reduced.

Furthermore, after the completion of the scanning of one display frame, two display frames or more display frames in the 3D image display mode, G1a, G2a, . . . , Gna connected to the second rows of sub-pixels in the respective rows of combined pixels respectively output the gate driving pulses sequentially, each gate driving maintains for one row scanning period, and the second row of sub-pixels which are driven receive the black picture data; different intervals may be set according to different liquid crystal lifespan, quality of image and liquid crystal characteristics, for example, it can be selected that the second rows of sub-pixels in the respective rows of combined pixels are driven and receive the black picture data after the completion of the display scanning of every four 3D display frames. It should be noted that the respective first rows of sub-pixels are turned off only after the completion of the display scanning of every four 3D display frames and then the respective second rows of sub-pixels receive the black picture data in the 3D image display mode, which may reduce the switching frequency of the display data and the black picture data on the data lines and thus may reduce the power consumption, as compared with a case where the respective first rows of sub-pixels are turned off after the completion of the display scanning of every 3D display frame and then the respective second rows of sub-pixels receive the black picture data. The case where the black frame is inserted after the completion of the display scanning of every four 3D display frames is described merely as an example, and makes no limitation to the scope of the present disclosure.

Figure 7:
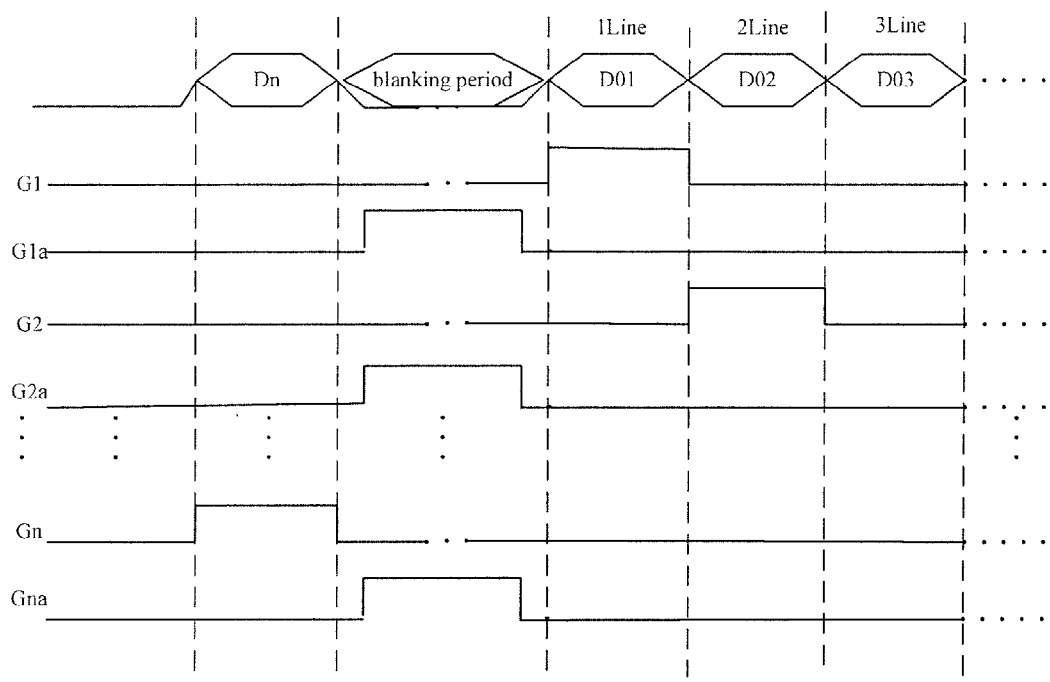
FIG. 7 is a timing sequence diagram of a black level inserting method in the 3D driving method of the image display device provided in the second embodiment of the present disclosure.

In addition, as shown in FIG. 7, the black frame may also be inserted during a field blanking period, that is, the operations that G1a, G2a, . . . , Gna connected to the second rows of sub-pixels in the respective rows of combined pixels respectively output gate driving pulses sequentially and that the second row of sub-pixels which are driven receives the black picture data may be implemented during the field blanking period, and the respective first rows of sub-pixels maintain to be turned off at the same time, such that it is ensured that the black picture data of the respective second rows of sub-pixels be refreshed continuously by using the blanking period, and thus the required black picture effect can be maintained in the 3D image display mode while the charging periods for the respective first rows of sub-pixels to receives the 3D display data are not reduced.

Figure 8:
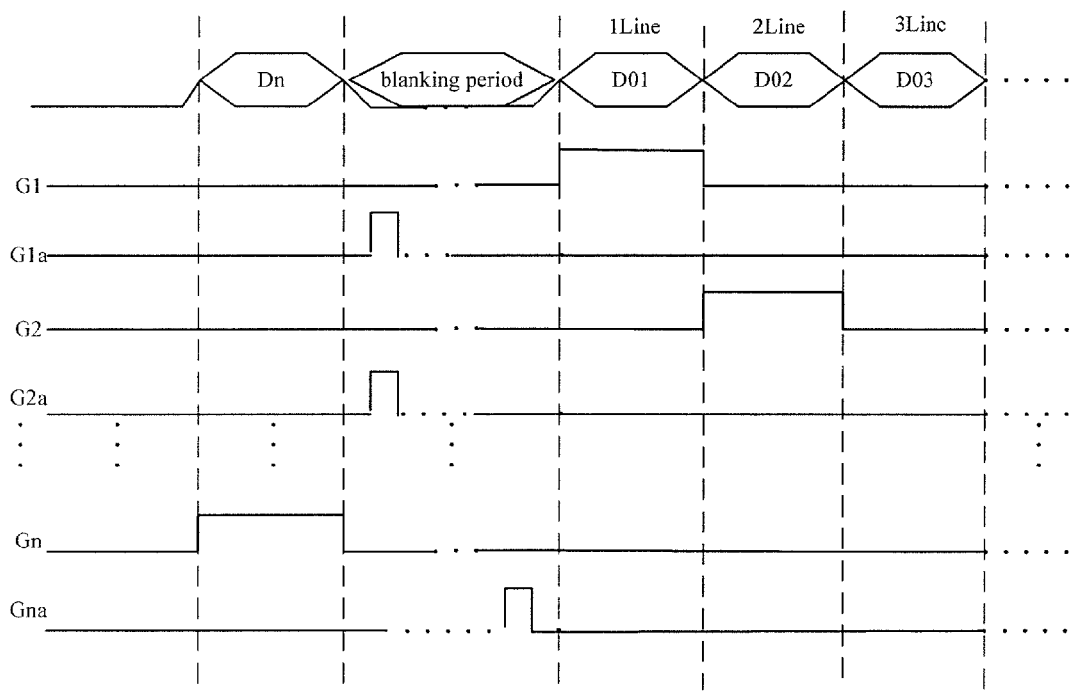
FIG. 8 is a timing sequence diagram of another black level inserting method in the 3D driving method of the image display device provided in the second embodiment of the present disclosure.

Furthermore, as shown in FIG. 8, G1a, G2a, . . . , Gna may be grouped into several groups during the blanking period, for example, G1a to G4a are grouped into a group, G5a to G8a are grouped into another group, and so on, such that the second gate lines in each group output gate driving pulses sequentially so as to drive the second rows of sub-pixels in the respective groups respectively, a surge caused by charging multiple rows at the same time may be reduced by grouping a plurality of second gate lines into one group, which benefits to an improvement of a stability and reliability of the display device, and the frequency variations of the gate driving may also be reduced at the same.

With the image display method provided in the embodiments of the present disclosure, in the 2D image display mode, both the first rows of sub-pixels and the second rows of sub-pixels in the respective rows of combined pixels receive the display data; in the 3D image display mode, the first rows of sub-pixels in the respective rows of combined pixels receive the display data and the second rows of sub-pixels in the respective rows of combined pixels do not receive data; when the 2D image display mode is converted into the 3D image display mode, and when scanning for a display frame is completed, or when it is in the blanking period, the second rows of sub-pixels in the respective rows of combined pixels, which are driven, receive the black picture data, the data received every time maintains one row scanning period, and the first rows of sub-pixels in the individual row of combined pixels, which are not driven, do not receive data. As compared with the prior art, both the first row of sub-pixels and the second row of sub-pixels in the individual row of combined pixels may receive the same display data simultaneously in the 2D image display mode, such that the period for receiving the display data may reach a whole row scanning period and thus the charging period of the display pixels may be ensured; the first rows of sub-pixels and the second rows of sub-pixels are not progressively scanned in a same frame in the 3D image display mode, that is, only the first rows of sub-pixels or the second rows of sub-pixels are scanned in a same frame, such that the frequency variations of the gate line driving and the data line driving may be reduced and thus the power consumption may also be reduced.

The above descriptions are only for illustrating the embodiments of the present disclosure, and in no way limit the scope of the present disclosure. It will be obvious that those skilled in the art may make modifications, variations and equivalences to the above embodiments without departing the spirit and scope of the present disclosure as defined by the following claims. Such variations and modifications are intended to be comprised within the spirit and scope of the present disclosure.

What is claimed is:

1. An image display device comprising:
   an image display panel for displaying a 2D image or a 3D image by using a plurality of combined pixels,
   wherein each of the plurality of combined pixels in the image display panel comprises a first row of sub-pixels and a second row of sub-pixels beneath the first row of sub-pixels, the first row of sub-pixels and the second row of sub-pixels form the combined pixel together, and for an individual row of combined pixels, a first gate line is connected to the first row of sub-pixels and a second gate line is connected to the second row of sub-pixels;

a driving unit for driving the first rows of sub-pixels and the second rows of sub-pixels in the respective rows of combined pixels simultaneously when the image display panel is in a 2D image display mode, and for driving one row of sub-pixels in the respective rows of combined pixels and not driving the other row of sub-pixels in the respective rows of combined pixels when the image display panel is in a 3D image display mode;

a transmitting unit for simultaneously transmitting display data to the first rows of sub-pixels and the second rows of sub-pixels in the respective rows of combined pixels, which are driven by the driving unit, when the image display panel is in the 2D image display mode, and for transmitting display data to one row of sub-pixels in the respective rows of combined pixels, which are driven by the driving unit, and not transmitting data to the other row of sub-pixels in the respective rows of combined pixels, which are not driven by the driving unit, when the image display panel is in the 3D image display mode, wherein when the image display panel is in the 3D image display mode, the driving unit sequentially drives the second rows of sub-pixels in the respective rows of combined pixels and does not drive the first rows of sub-pixels in the respective rows of combined pixels, and the transmitting unit sequentially transmits black picture data to the second rows of sub-pixels in the respective rows of combined pixels, which are driven by the driving unit, and does not transmit the display data to the first rows of sub-pixels in the respective rows of combined pixels, which are not driven by the driving unit, and wherein the second rows of sub-pixels and the first rows of sub-pixels are not scanned progressively in a same frame.

2. The image display device of claim 1, wherein when the image display panel is in the 3D image display mode, the driving unit further drives the first rows of sub-pixels in the respective rows of combined pixels and does not drive the second rows of sub-pixels in the respective rows of combined pixels, and the transmitting unit transmits the display data to the first rows of sub-pixels in the respective rows of combined pixels, which are driven by the driving unit, and does not transmit black picture data to the second rows of sub-pixels in the respective rows of combined pixels, which are not driven by the driving unit.

3. The image display device of claim 1, wherein when the image display panel is in the 2D image display mode, the driving unit drives the first rows of sub-pixels and the second rows of sub-pixels in the respective rows of combined pixels simultaneously comprises:

the driving unit drives sequentially the first gate lines connected to the first rows of sub-pixels in the respective rows of combined pixels respectively to output gate driving pulses, so as to drive the first rows of sub-pixels in the respective rows of combined pixels respectively; and the gate driving pulses output from the first gate lines under the driving of the driving unit are transmitted at the same time to the second rows of sub-pixels through the second gate lines respectively, so as to supply the gate driving voltages to drive the second rows of sub-pixels in the respective rows of combined pixels respectively.

4. The image display device of claim 2, wherein the driving unit drives one row of sub-pixels in the respective rows of combined pixels and does not drives the other row of sub-pixels in the respective rows of combined pixels comprises:

the driving unit drives sequentially the first gate lines connected to the first rows of sub-pixels in the respective rows of combined pixels respectively to output gate driving pulses, so as to supply gate driving voltages to the first rows of sub-pixels respectively; and the driving unit does not drive the second gate lines connected to the second rows of sub-pixels in the respective rows of combined pixels respectively, and the second gate lines do not output gate driving pulses.

5. The image display device of claim 1, wherein when the image display panel is in the 3D image display mode, the driving unit drives the second rows of sub-pixels in the respective rows of combined pixels and does not drive the first rows of sub-pixels in the respective rows of combined pixels, and the transmitting unit transmits black picture data to the second rows of sub-pixels in the respective rows of combined pixels, which are driven by the driving unit, and does not transmit the display data to the first rows of sub-pixels in the respective rows of combined pixels, which are not driven by the driving unit, comprises:

the driving unit drives sequentially the second gate lines connected to the second rows of sub-pixels in the respective rows of combined pixels respectively to output gate driving pulses, so as to supply gate driving voltages to the second rows of sub-pixels in the respective rows of combined pixels respectively; and the driving unit does not drive the first gate lines connected to the first rows of sub-pixels in the respective rows of combined pixels respectively, and the first gate lines do not output gate driving pulses;

after a completion of display scanning of a current 3D display frame, the transmitting unit transmits the black picture data to the second rows of sub-pixels in the respective rows of combined pixels, which are driven by the driving unit, and does not transmit the display data to the first rows of sub-pixels in the respective rows of combined pixels, which are not driven by the driving unit.

6. The image display device of claim 1, wherein the driving unit drives the second rows of sub-pixels in the respective rows of combined pixels and does not drive the first rows of sub-pixels in the respective rows of combined pixels;

when the image display panel converts from the 2D image display mode into the 3D image display mode, the transmitting unit transmits the black picture data to the second rows of sub-pixels in the respective rows of combined pixels, which are driven by the driving unit, and does not transmit the display data to the first rows of sub-pixels in the respective rows of combined pixels, which are not driven by the driving unit.

7. The image display device of claim 1, wherein for a Normal-Black type display device, in the 3D image display mode, after a completion of display scanning of a current 3D display frame, the driving unit does not drive the first gate lines connected to the first rows of sub-pixels in the respective rows of combined pixels respectively, and does not drive the second gate lines connected to the second rows of sub-pixels in the respective rows of combined pixels respectively;

the transmitting unit does not transmit the 3D display data to the first rows of sub-pixels in the respective rows of combined pixels, which are not driven by the driving unit, and does not transmit the black picture data to the second rows of sub-pixels in the respective rows of combined pixels, which are not driven by the driving unit.

8. The image display device of claim 2, wherein for a Normal-Black type display device, in the 3D image display mode, after a completion of display scanning of a current 3D display frame, the driving unit does not drive the first gate lines connected to the first rows of sub-pixels in the respective rows of combined pixels respectively, and does not drive the second gate lines connected to the second rows of sub-pixels in the respective rows of combined pixels respectively;

the transmitting unit does not transmit the 3D display data to the first rows of sub-pixels in the respective rows of combined pixels, which are not driven by the driving unit, and does not transmit the black picture data to the second rows of sub-pixels in the respective rows of combined pixels, which are not driven by the driving unit.

9. The image display device of claim 1, wherein for a Normal-Black type display device, in the 3D image display mode, after a completion of display scanning of a current 3D display frame, the driving unit does not drive the first gate lines connected to the first rows of sub-pixels in the respective rows of combined pixels respectively, and does not drive the second gate lines connected to the second rows of sub-pixels in the respective rows of combined pixels respectively;

the transmitting unit does not transmit the 3D display data to the first rows of sub-pixels in the respective rows of combined pixels, which are not driven by the driving unit, and does not transmit the black picture data to the second rows of sub-pixels in the respective rows of combined pixels, which are not driven by the driving unit.

10. The image display device of claim 5, wherein for a Normal-Black type display device, in the 3D image display mode, after a completion of display scanning of a current 3D display frame, the driving unit does not drive the first gate lines connected to the first rows of sub-pixels in the respective rows of combined pixels respectively, and does not drive the second gate lines connected to the second rows of sub-pixels in the respective rows of combined pixels respectively;

the transmitting unit does not transmit the 3D display data to the first rows of sub-pixels in the respective rows of combined pixels, which are not driven by the driving unit, and does not transmit the black picture data to the second rows of sub-pixels in the respective rows of combined pixels, which are not driven by the driving unit.

11. The image display device of claim 5, wherein after a completion of display scanning of every N 3D display frames, the driving unit drives sequentially the second gate lines connected to the second rows of sub-pixels in the respective rows of combined pixels respectively to output gate driving pulses; the transmitting unit transmits black picture data to the second rows of sub-pixels in the respective rows of combined pixels, which are driven by the driving unit, wherein N≥1.

12. The image display device of claim 1, wherein when the image display device is in the 3D image display mode, during a field blanking period, the driving unit drives sequentially the second gate lines connected to the second rows of sub-pixels in the respective rows of combined pixels respectively to output gate driving pulses;

the transmitting unit transmits black picture data to the individual second rows of sub-pixels, which are driven by the driving unit.

13. The image display device of claim 12, wherein all of the second gate lines are groups into X groups, and in the field blanking period, the driving unit drives sequentially the second gate lines in respective groups to output gate driving pulses, wherein X≥1 and X is less than a total number of the second gate lines.

14. An image display method for driving an image display device comprising combined pixels of m columns and n rows, wherein each of the combined pixels comprises a first row of sub-pixels and a second row of sub-pixels beneath the first row of sub-pixels, the first row of sub-pixels and the second row of sub-pixels form the combined pixel together, and for an individual row of combined pixels, a first gate line is connected to the first row of sub-pixels and a second gate line is connected to the second row of sub-pixels, the method comprising:

in a 2D image display mode, both the first rows of sub-pixels and the second rows of sub-pixels in the respective rows of combined pixels are driven and receive 2D display data;

in a 3D image display mode, one row of sub-pixels in the respective rows of combined pixels are driven and the other row of sub-pixels in the respective rows of combined pixels are not driven, the one row of sub-pixels in the respective rows of combined pixels, which are driven, receive the 3D display data and the other row of sub-pixels in the respective rows of combined pixels, which are not driven, do not receive the 3D display data, wherein in the 3D image display mode, further comprises:

the second rows of sub-pixels in the respective rows of combined pixels are sequentially driven and the first rows of sub-pixels in the respective rows of combined pixels are not driven, and the second rows of sub-pixels in the respective rows of combined pixels, which are driven, sequentially receive black picture data and the first rows of sub-pixels in the respective rows of combined pixels, which are driven, do not receive data, and wherein the second rows of sub-pixels and the first rows of sub-pixels are not scanned progressively in a same frame.

15. The image display method of claim 14, wherein in the 3D image display mode, further comprises:

the first rows of sub-pixels in the respective rows of combined pixels are driven and the second rows of sub-pixels in the respective rows of combined pixels are not driven, and the first rows of sub-pixels in the respective rows of combined pixels, which are driven, receive the display data and the second rows of sub-pixels in the respective rows of combined pixels, which are not driven, do not receive data.

16. The image display method of claim 14, wherein in the 2D image display mode, the first rows of sub-pixels and the second rows of sub-pixels in the respective rows of combined pixels are driven simultaneously comprises:

the first rows of sub-pixels in the respective rows of combined pixels are driven respectively by gate driving voltages supplied by gate driving pulses output sequentially from the first gate lines connected respectively to the first rows of sub-pixels; and the second rows of sub-pixels in the respective rows of combined pixels are driven respectively by the gate driving voltages transmitted via the second gate lines and supplied by the gate driving pulses output sequentially from the first gate lines.

17. The image display method of claim 15, wherein the second rows of sub-pixels in the respective rows of combined pixels are driven and the first rows of sub-pixels in the respective rows of combined pixels are not driven, and the second rows of sub-pixels in the respective rows of combined pixels, which are driven, receive the black picture data and the first rows of sub-pixels in the respective rows of combined pixels, which are not driven, do not receive data, comprises:

after a completion of display scanning of a current 3D display frame, the second rows of sub-pixels in the respective rows of combined pixels are driven respectively by gate driving voltages supplied by gate driving pulses output sequentially from the second gate lines connected respectively to the second rows of sub-pixels; and the first gate lines connected respectively to the first rows of sub-pixels in the respective rows of combined pixels do not output the gate driving pulses, and the first rows of sub-pixels in the respective rows of combined pixels are not driven;

the second rows of sub-pixels in the respective rows of combined pixels, which are driven, receive the black picture data and the first rows of sub-pixels in the respective rows of combined pixels, which are not driven, do not receive data.

18. The image display method of claim 17, wherein after a completion of display scanning of every N 3D display frames, the second rows of sub-pixels in the respective rows of combined pixels are driven respectively by the gate driving voltage supplied by the gate driving pulses output sequentially from the second gate lines connected respectively to the second rows of sub-pixels; and the second rows of sub-pixels in the respective rows of combined pixels, which are driven, receive the black picture data, wherein $N \geq 1$.

* * * * *